(12) United States Patent
Lee (10) Patent No.: US 10,108,334 B2
(45) Date of Patent: Oct. 23, 2018

(54) GESTURE DEVICE, OPERATION METHOD FOR SAME, AND VEHICLE COMPRISING SAME

(71) Applicant: LG INNOTEK CO., LTD., Seoul (KR)

(72) Inventor: Jung Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/113,408

(22) PCT Filed: Jan. 14, 2015

(86) PCT No.: PCT/KR2015/000402
§ 371 (c)(1),
(2) Date: Jul. 21, 2016

(87) PCT Pub. No.: WO2015/111869
PCT Pub. Date: Jul. 30, 2015

(65) Prior Publication Data
US 2017/0010797 A1    Jan. 12, 2017

(30) Foreign Application Priority Data

Jan. 22, 2014  (KR) .......................... 10-2014-0007631

(51) Int. Cl.
| | |
|---|---|
| *G06F 3/042* | (2006.01) |
| *G06F 3/0488* | (2013.01) |
| *G06T 7/20* | (2017.01) |
| *G06F 3/01* | (2006.01) |
| *G06F 3/0484* | (2013.01) |
| *G06K 9/00* | (2006.01) |
| *B60K 37/00* | (2006.01) |

(Continued)

(52) U.S. Cl.
CPC .......... *G06F 3/04883* (2013.01); *B60K 37/00* (2013.01); *G06F 1/325* (2013.01);
(Continued)

(58) Field of Classification Search
CPC ........ G06F 3/04883; G06F 3/01; G06F 3/017; G06F 3/0304; G06F 3/0484;
(Continued)

(56) References Cited

U.S. PATENT DOCUMENTS

| | | |
|---|---|---|
| 2006/0187196 A1 | 8/2006 | Underkoffler et al. |
| 2009/0278915 A1 | 11/2009 | Kramer et al. |

(Continued)

FOREIGN PATENT DOCUMENTS

| | | |
|---|---|---|
| CN | 102112945 A | 6/2011 |
| GB | 2474536 A | 4/2011 |

(Continued)

OTHER PUBLICATIONS

International Search Report issued in PCT/KR2015/000402 dated Apr. 21, 2015.

*Primary Examiner* — Mark Edwards
(74) *Attorney, Agent, or Firm* — Birch, Stewart, Kolasch & Birch, LLP (57) ABSTRACT

A gesture device comprises: an input module for obtaining an image; a gesture process unit for extracting a gesture from the obtained image; and a control unit for controlling to convert a lock state mode to an idle state mode on the basis of the extracted gesture. A vehicle includes: a driver's seat; a console box disposed next to the driver's seat; a gear knob; and a rearview mirror. The vehicle includes: an input module installed on the lower portion of the rearview mirror so as to obtain an image; a gesture process unit for extracting a gesture from the obtained image; and a control unit for controlling to convert a lock state mode to an idle state mode on the basis of the extracted gesture and to perform a function corresponding to the extracted gesture.

5 Claims, 9 Drawing Sheets

(51) Int. Cl.
    *G06F 3/03* (2006.01)
    *G06F 1/32* (2006.01)
    *G06F 21/32* (2013.01)
(52) U.S. Cl.
    CPC ............ *G06F 1/3259* (2013.01); *G06F 3/017* (2013.01); *G06F 3/0304* (2013.01); *G06F 3/0484* (2013.01); *G06F 21/32* (2013.01); *G06K 9/00355* (2013.01); *G06K 9/00845* (2013.01); *G06T 7/20* (2013.01); *B60K 2350/1052* (2013.01); *Y02D 10/155* (2018.01); *Y02D 50/20* (2018.01)
(58) Field of Classification Search
    CPC ....... G06F 1/3203; G06F 21/31; B60K 37/00; B60K 2350/1052; B60W 50/08; G06K 9/00355; G06K 9/00845; G06T 7/20
    USPC ........................................................ 345/175
    See application file for complete search history.

(56) References Cited

U.S. PATENT DOCUMENTS

| | | |
|---|---|---|
| 2010/0306718 A1 | 12/2010 | Shim et al. |
| 2012/0034904 A1 | 2/2012 | LeBeau et al. |
| 2012/0200494 A1 | 8/2012 | Perski et al. |
| 2012/0215403 A1* | 8/2012 | Tengler ................. B60W 50/12 701/36 |
| 2012/0274549 A1 | 11/2012 | Wehling et al. |
| 2012/0329529 A1 | 12/2012 | van der Raadt |
| 2013/0050458 A1 | 2/2013 | Kim et al. |
| 2013/0155237 A1* | 6/2013 | Paek ...................... G06F 1/1632 348/148 |
| 2013/0194422 A1* | 8/2013 | Xia ........................ G03B 17/38 348/143 |
| 2013/0261871 A1 | 10/2013 | Hobbs et al. |
| 2013/0293454 A1 | 11/2013 | Jeon et al. |
| 2014/0139641 A1* | 5/2014 | Holz .................... G06K 9/3233 348/47 |

FOREIGN PATENT DOCUMENTS

| | | |
|---|---|---|
| KR | 10-0967556 B1 | 7/2010 |
| KR | 10-2011-0022057 A | 3/2011 |
| KR | 10-2012-0049249 A | 5/2012 |
| KR | 10-2013-0100280 A | 9/2013 |
| KR | 10-2013-0124139 A | 11/2013 |
| KR | 10-2013-0124143 A | 11/2013 |
| WO | WO 2010/137859 A2 | 12/2010 |
| WO | WO 2013/151614 A1 | 10/2013 |

* cited by examiner

GESTURE DEVICE, OPERATION METHOD FOR SAME, AND VEHICLE COMPRISING SAME

CROSS REFERENCE TO RELATED APPLICATIONS

This application is the National Phase of PCT International Application No. PCT/KR2015/000402, filed on Jan. 14, 2015, which claims priority under under 35 U.S.C. 119(a) to Patent Application No. 10-2014-0007631, filed in the Republic of Korea on Jan. 22, 2014, all of which are hereby expressly incorporated by reference into the present application.

TECHNICAL FIELD

The present disclosure relates to a device that is operated by a gesture.

BACKGROUND ART

Recently, multimedia electronic devices that provide information to users have been actively developed and launched.

As a representative example of these multimedia electronic devices, there is a mobile device such as a smartphone.

The mobile device has both mobility and portability and includes various functions such as phone call, listening to music, video watching, message transmission and reception, scheduling, Internet surfing, and the like.

On the other hand, research has been conducted to apply these multimedia electronic devices to vehicles.

In order to receive input commands for performing various functions of the multimedia electronic device, various buttons are installed in the exterior of the multimedia electronic device. A user can operate various buttons to perform the corresponding functions.

However, it is difficult for the user to know what functions are performed by the various buttons. Even though the user knows the corresponding functions of the buttons, it is very inconvenient for the user to perform operations by pressing the corresponding buttons one by one.

Furthermore, in the case of a small-sized multimedia electronic device, a gap between the respective buttons is narrow due to a limitation of an occupied area thereof, there is a problem that malfunction occurs due to a user's wrong button selection.

DISCLOSURE OF THE INVENTION

Technical Problem

Embodiments provide a gesture device in which malfunction occurrence possibility is minimized, and a method for operating the same.

Embodiments provide a gesture device in which a user's device operation convenience is maximized, and a method for operating the same.

Embodiments provide a vehicle including a gesture device.

Technical Solution

In one embodiment, a gesture device includes: an input module configured to acquire a first image; a gesture processing unit configured to extract a gesture from the acquired first image; and a control unit configure to perform control to change a locked state mode to an idle state mode, based on the extracted gesture.

In another embodiment, a vehicle includes a driver seat, a console box disposed adjacent to the driver seat, a gear knob, and a rearview mirror. The vehicle includes: an input module installed in a lower side of the rearview mirror so as to acquire an image; a gesture processing unit configured to extract a gesture from the acquired image; and a control unit configured to change a locked state mode to an idle state mode, based on the extracted gesture, and perform a function corresponding to the extracted gesture.

In further another embodiment, a method for operating a gesture device includes: acquiring a first image; extracting a first gesture from the first image; checking whether the extracted first gesture is an activation gesture; and when the extracted first gesture is the activation gesture, changing a locked state mode to an idle state mode.

Advantageous Effects

In embodiments, a locked state mode is initially set, and malfunction caused by a gesture does not occur even when any gestures are taken in the locked state mode. Accordingly, it is possible to prevent a deterioration in the reliability of products due to malfunction, thereby achieving quality improvement.

In embodiments, since various functions are performed by various gestures, it is possible to solve the existing inconvenience occurring when the functions are performed by operating a plurality of buttons or to prevent malfunction caused by a narrow gap between the buttons.

MODE FOR CARRYING OUT THE INVENTION

In the description of embodiments, it will be understood that when an element is referred to as being "on" or "under" another element, it can be directly on or under the element, and one or more intervening elements may also be present therebetween. The expression "on" or "under" may include a meaning of a downward direction as well as an upward direction with respect to one element. In addition, a "signal" may be a voltage signal or a current signal.

Figure 1:
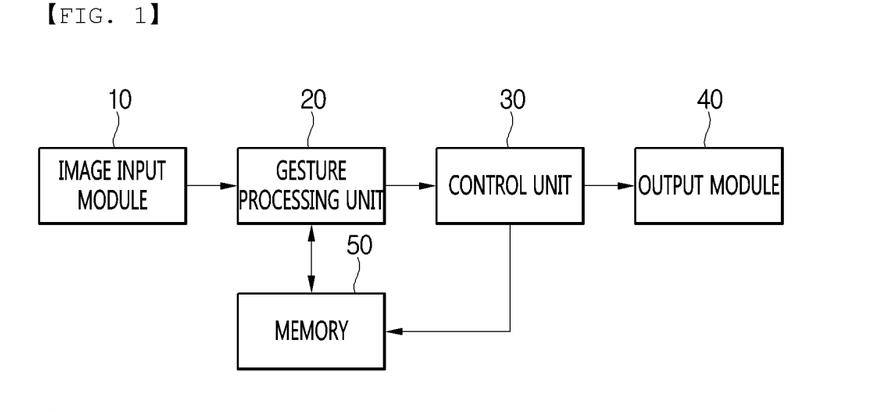
FIG. 1 is a block diagram illustrating a gesture device according to an embodiment.

FIG. 1 is a block diagram illustrating a gesture device according to an embodiment.

Referring to FIG. 1, the gesture device according to the embodiment may include an image input module 10, a gesture processing unit 20, a control unit 30, an output module 40, and a memory 50.

Figure 4:
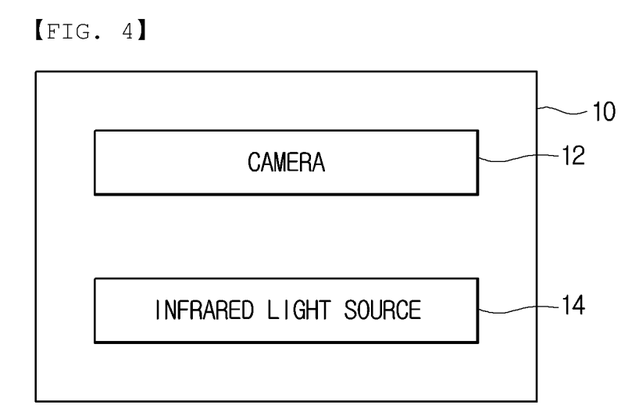
FIG. 4 is a block diagram illustrating an image input module of FIG. 1.

The image input module 10 inputs an image of an object. As illustrated in FIG. 4, the image input module 10 may include a camera 12 and an infrared light source 14.

The camera 12 may acquire an image from an object and output an electrical signal. The camera 12 may acquire an image in real time under control of the control unit 30. Therefore, an image of a stationary object or a moving object may be acquired in real time by the camera 12.

In a case where the camera 12 is installed in, for example, a vehicle, when the vehicle is started up, the camera 12 may be driven under control of the control unit 30 that recognizes the startup of the vehicle.

Alternatively, a user may directly drive the camera 12, regardless of the startup of the vehicle.

The infrared light source 14 may include, for example, an infrared light-emitting device (LED), but is not limited thereto.

The infrared light source 14 may be disposed adjacent to the camera 12, but is not limited thereto.

The infrared light source 14 may be driven, for example, in the nighttime under control of the control unit 30. In the case of the nighttime, since infrared light is irradiated by the infrared light source 14, an image acquired by the camera 12 has brightness, and thus, an object and a non-object may be distinguished from each other.

Figure 2:
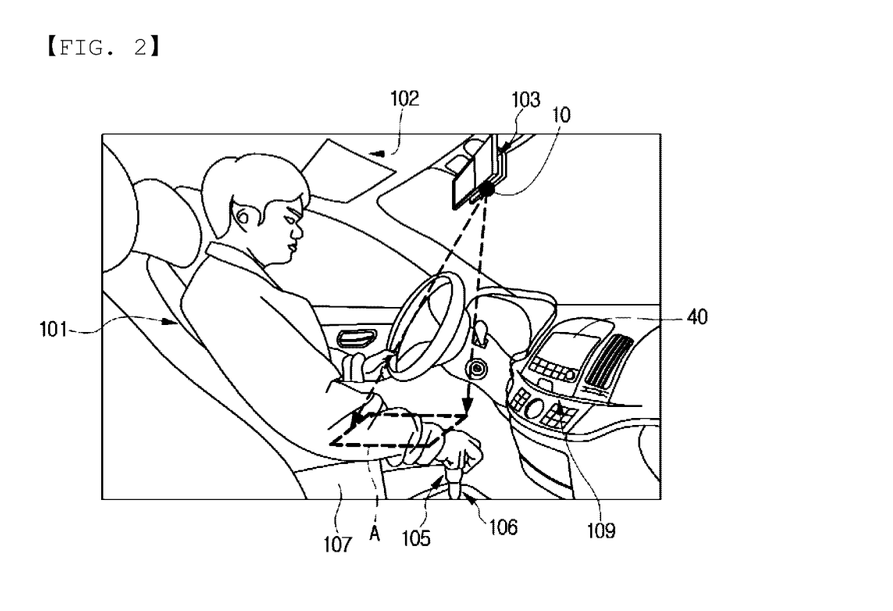
FIG. 2 is a view illustrating a vehicle including a gesture device according to an embodiment.

As illustrated in FIG. 2, the gesture device according to the embodiment may be installed in, for example, a vehicle.

Figure 3:
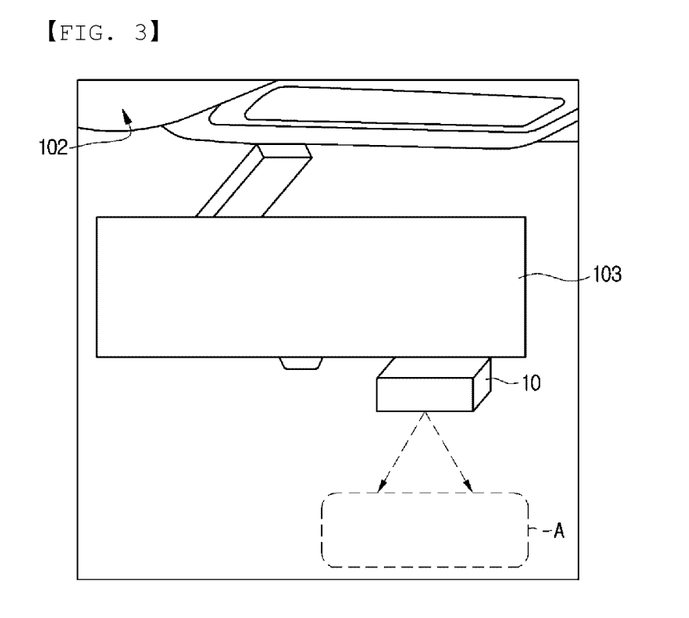
FIG. 3 is a view illustrating an image input module installed in a rearview mirror of FIG. 2.

In the inside of the vehicle, a rearview mirror 103 may be provided on a front ceiling 102, and a console box 107 and a gear shift lever 106 with a gear knob 105 may be provided beside a driver seat 101. Also, a center fascia 109 may be provided between the driver seat 101 and a passenger seat (not illustrated). The rearview mirror 103 may be installed on the ceiling 102 adjacent to an upper side of a front glass, but is not limited thereto. The rearview mirror 103 may be installed on the ceiling 102 perpendicular to the console box 107 and the gear knob 105 or the ceiling 102 directed in a diagonal direction As illustrated in FIG. 3, the image input module 10 may be installed in, for example, a part of a lower side of the rearview mirror 103 of the vehicle, but is not limited thereto.

The image input module 10 may be installed in, for example, a part of an inner surface of the ceiling 102 of the vehicle, but is not limited thereto.

Even though the image input module 10 is installed in a part of the lower side of the rearview mirror 103 of the vehicle or a part of the inner surface of the ceiling 102 of the vehicle, the image input module 10 has to acquire an image of, for example, a driver's hand and/or a driver's forearm near to the hand. Herein, the forearm may be between a wrist and an elbow, but is not limited thereto.

A region, an image of which is acquired by the image input module 10, may be referred to as an image acquisition region A. The image acquisition region A may include the gear knob 105, the console box 107, and a region between the gear knob 105 and the console box 107. The gear knob 105 is installed in an upper end of the gear shift lever 106 to improve a user's sense of grip.

Therefore, an image of an object placed in the image acquisition region A may be acquired by the image input module 10.

Figure 5:
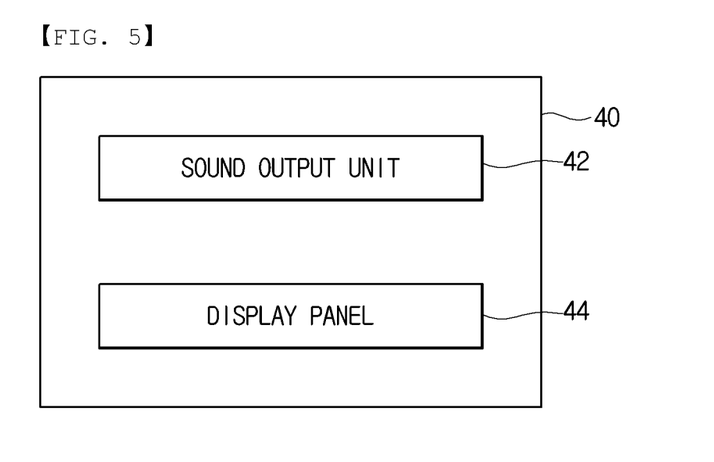
FIG. 5 is a block diagram illustrating an output module of FIG. 1.

The output module 40 may also be installed in the vehicle. As illustrated in FIG. 5, the output module 40 may include a sound output unit 42 and a display panel 44.

The display panel 44 is a member for displaying a still image or a moving image and may be installed in, for example, the center fascia 109. The display panel 44 may display, for example, a movie, a music video, or a navigation screen. Also, the display panel 44 may display a face of the other party during a video call or an image sent by the other party.

The sound output unit 42 is a member for outputting an audio signal and may be installed in each door or the ceiling 102 of the vehicle.

The control unit 30 may control each component, that is, the image input module 10, the gesture processing unit 20, the output module 40, and the memory 50 as a whole.

For example, the control unit 30 may perform control so that an image is acquired by the camera 12 of the image input module 10, and may perform control so that light is irradiated by the infrared light source 14 of the image input module 10 in a nighttime mode.

For example, the control unit 30 may perform control so that an audio signal is outputted by the sound output unit 42 of the output module 40, and may perform control so that an image signal is outputted by the display panel 44 of the output module 40.

For example, the control unit 30 may perform control so that new data is updated in the memory 50, and may perform control so that previously stored data is deleted and modified.

For example, the control unit 30 may perform control so that an operation corresponding to a user's event is performed based on the output result of the gesture processing unit 20.

A control operation of the control unit 30 based on the output result of the gesture processing unit 20 will be described below in detail.

Figure 6:
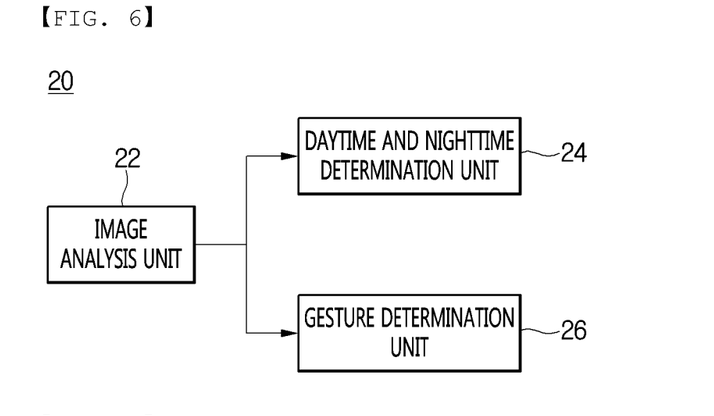
FIG. 6 is a block diagram illustrating a gesture processing unit of FIG. 1.

As illustrated in FIG. 6, the gesture processing unit 20 may include an image analysis unit 22, a daytime and nighttime determination unit 24, and a gesture determination unit 26.

The image analysis unit 22 may analyze an image of frame unit provided from the camera 12 of the image input module 10. The image analysis unit 22 may detect brightness information of the image, a shape of the object, shape motion information of the object, silhouette (contour) information of the object, and color information of the object. The brightness information of the image may be provided to the daytime and nighttime determination unit 24. The shape motion information of the object, the silhouette information of the object, and the color information of the object may be provided to the gesture determination unit 26.

The daytime and nighttime determination unit 24 may determine whether it is daytime or nighttime, based on the brightness information of the image. For example, when a brightness average level of entire images of 30 frames is greater than or equal to a threshold value, it may be determined as daytime. For example, when a brightness average level of entire images of 30 frames is less than the threshold value, it may be determined as nighttime. If it is determined as nighttime, the infrared light source 14 of the image input module 10 may be driven to irradiate infrared light under control of the control unit 30. Subsequently, an image to which the infrared light is reflected may be acquired again by the camera 12.

The gesture determination unit 26 may determine whether a user's gesture is an activation gesture or a driving gesture, based on the shape information of the object, the shape motion information of the object, the silhouette information of the object, and the color information of the object.

Herein, the driving gesture may mean an input command for performing a plurality of preset functions with respect to the gesture device according to the embodiment. Therefore, a plurality of driving gestures may exist.

One gesture among the plurality of driving gestures may or may not be the same as the activation gesture. Even though the driving gesture is the same as the activation gesture, the gesture device according to the embodiment can be operated without errors. For example, when the activation gesture (first gesture) is the same as one gesture (second gesture) among the plurality of driving gestures, the first gesture extracted from a first image earlier inputted by the image input module 10 may be recognized as the activation gesture, and thus, a mode may be changed to an idle state mode. Thereafter, the second gesture extracted from a second image inputted by the image input module 10 may be recognized as the driving gesture, and a function corresponding to the second gesture may be performed.

For example, as the driving gesture, a home gesture for displaying a home screen, an input gesture for displaying an input window for inputting a text or a number, a left gesture, a right gesture, an up gesture, and a down gesture for displaying a next screen or a previous screen, and a shortcut key gesture for immediately performing a preset operation may be used, but the driving gesture is not limited thereto.

The activation gesture may be a gesture for unlocking a locking device so as to prevent malfunction from occurring due to a lot of the above-described gestures. Due to the activation gesture, the mode may be changed to an idle state mode for recognizing the driving gesture. A mode prior to the idle state mode may be referred to as a locked state mode. Accordingly, due to the activation gesture, the locked state mode may be changed to the idle state mode.

The activation gesture may be preset in the memory 50 in such a manner that a shape of a specific object is set as a shape motion of the specific object.

Figure 7:
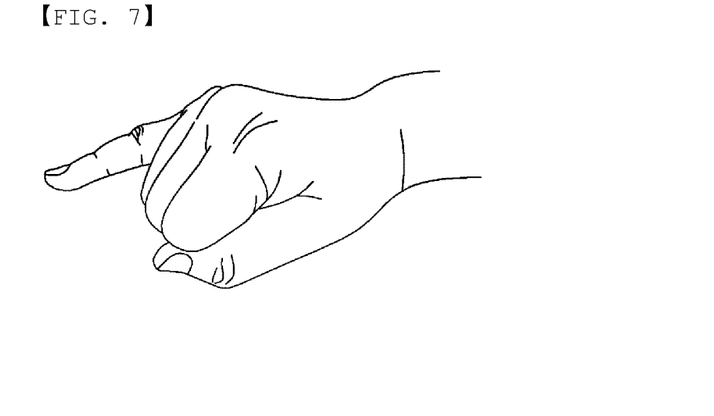
FIG. 7 is a view illustrating an example of an activation gesture.

For example, as illustrated in FIG. 7, in a case where the activation gesture of spreading out only a little finger and closing the other fingers is set in the memory 50, the locked state mode may be changed to the idle state mode by such a gesture of the user.

For example, the driving gesture may also be preset to perform a corresponding function in response to the driving gesture of the user, but is not limited thereto.

Various algorithms may be applied to the gesture determination unit 26.

Although one of the various algorithms will be described below, embodiments are not limited thereto.

Figure 8:
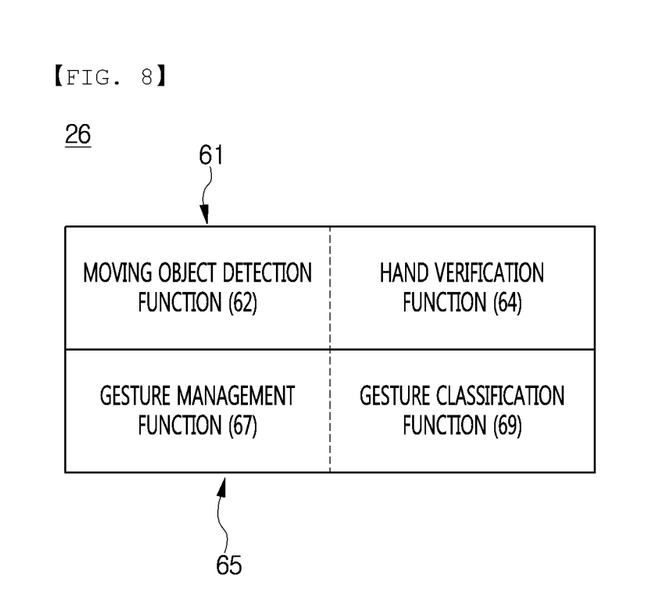
FIG. 8 is a view illustrating a detailed configuration of a gesture determination unit.

As illustrated in FIG. 8, the gesture determination unit 26 may be divided into a hand segmentation function 61 and a hand classification function 65.

The hand segmentation function 61 may be divided into a moving object detection function 62 and a hand verification function 64.

Regarding the hand segmentation function 61, different algorithms may be applied according to the daytime and the nighttime. That is, in the case of the nighttime, since color information is not included in an image acquired by the image input module 10, silhouette information, motion information of feature points of the silhouette, brightness information, and the like may be used.

The moving object detection function 62 may find blobs corresponding to, for example, a rear portion of a hand in the image acquired by the image input module 10, and detect information related to the blobs, for example, locations of feature points or locations of corner points of a region of interest (ROI).

The hand verification function 64 accurately separates a region corresponding to the hand from a previous image, and detects coordinate values (x, y) of all pixels in the corresponding region and silhouette information of the corresponding region, that is, coordinates (x, y) of the outermost pixels of the corresponding region. In addition, the hand verification function 64 estimates a coordinate value so that a hand region is located in a next image, and provides the estimated coordinate value to the moving object detection function 62. Since the moving object detection function 62 can narrow a detection range of a candidate region (ROI) in which a hand is to be located, based on the information provided from the hand verification function 64, the hand region can be detected more accurately.

The hand classification function 65 may be divided into a gesture management function 67 and a gesture classification function 69.

In order to achieve an efficient and accurate gesture recognition and reduce an operational time, the gesture management function 67 may perform a flow management with respect to all gestures after the change to the idle state mode.

The gesture classification function 69 may detect a shape or a motion pattern of a hand by using feature point information provided by the moving object detection function 62, and remove a gesture shape unintended by the user from the detected hand motion, thereby outputting only a gesture shape intended by the user. The gesture classification function 69 may prevent malfunction caused by the gesture shape unintended by the user.

Figure 9:
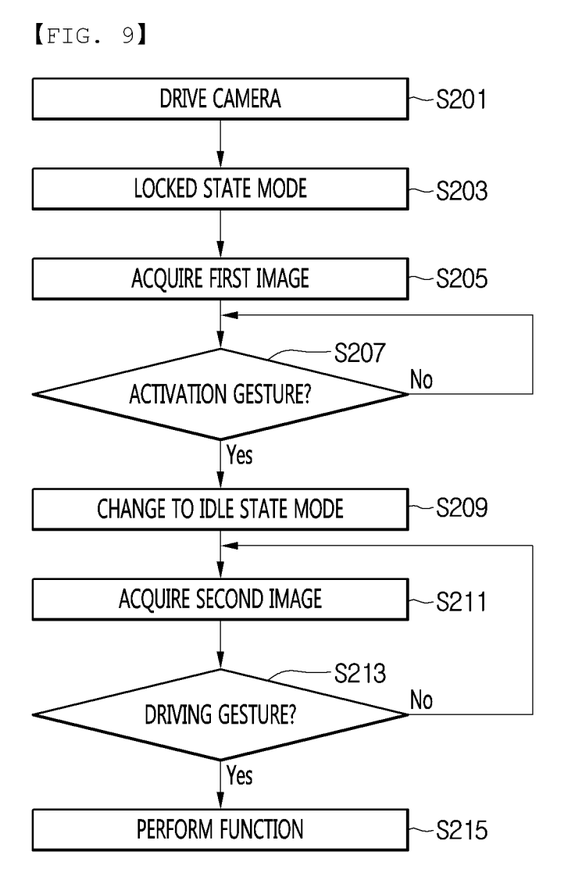
FIG. 9 is a flowchart describing a method for operating a gesture device according to a first embodiment.

FIG. 9 is a flowchart describing a method for operating a gesture device according to a first embodiment.

Referring to FIGS. 1, 4, and 9, the camera 12 of the image input module 10 may be driven under control of the control unit 30 (S201).

For example, when the vehicle is started up, the control unit 30 may recognize the startup of the vehicle and perform control to drive the camera 12.

For example, when a user's event, for example, a pressing of a button for driving the camera 12, is detected, the control unit 30 may perform control to drive the camera 12.

At this time, the gesture device may be set to a locked state mode (S203). That is, due to the driving of the camera 12, it is possible to acquire an image of an object located in an image acquisition region A corresponding to a lens of the camera 12. At this time, when the user unconsciously takes a specific gesture in the image acquisition region A, the specific gesture is recognized as the driving gesture, and thus, malfunction to perform a specific function may occur.

In the embodiment, in order to prevent such malfunction, a function by a gesture may be performed only after the locked state mode is released and changed to an idle state mode by a preset specific gesture, that is, an activation gesture.

Therefore, in a case where the mode is set to the locked state mode, the malfunction by the gesture does not occur even when any gestures except for the specific gesture are taken in the image acquisition region A.

A first image of an object located in the image acquisition region A may be acquired by the driven camera 12 (S205).

The gesture processing unit 20 checks whether a gesture extracted from the acquired first image is the activation gesture (S207).

The gesture processing unit 20 may analyze the first image to detect shape information of the object, shape motion information of the object, color information of the object, and the like, may determine whether a gesture is present in the first image, based on the detected information, and, when the gesture is present, may determine whether the gesture matches the preset activation gesture.

For example, a gesture of a hand shape as illustrated in FIG. 7 may be set as the activation gesture in the memory 50. That is, the activation gesture may have a shape of spreading out only a little finger and closing the other fingers. In this case, the gesture processing unit 20 determines whether the gesture is present in the first image and the present gesture is the same as the gesture of the hand shape illustrated in FIG. 7.

When the gesture present in the first image is the same as the preset activation gesture, the control unit 30 may change the locked state mode to the idle state mode (S209). The idle state mode may be a function activation state in which various functions capable of being realized in the gesture device according to the embodiment can be performed based on various gestures.

After the locked state mode is changed to the idle state mode, various functions can be performed. Even when a gesture for performing a specific function is taken in the locked state mode and an image of such a gesture is acquired by the camera 12, the corresponding function cannot be performed because the mode is set to the locked state mode. In contrast, when the mode is changed to the idle state mode, the corresponding specific function can be performed in response to the gesture for performing the specific function.

Various gestures may be set corresponding to various functions so that the gesture device according to the embodiment performs various functions.

Figure 10:
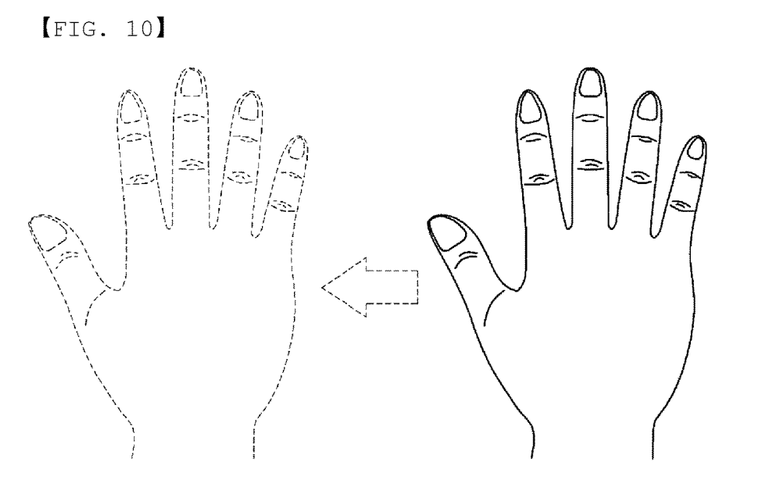
FIG. 10 is a view illustrating an example of a driving gesture.

For example, as illustrated in FIG. 10, in the case of a gesture of moving a hand to the left, a user interface (UI) screen displayed on the display panel 44 of the output module 40 disappears to the left due to such a left gesture, and a next UI screen may be displayed instead on the display panel 44.

Figure 11:
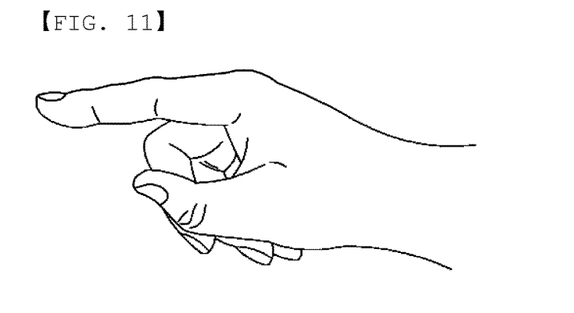
FIG. 11 is a view illustrating another example of the driving gesture.

For example, as illustrated in FIG. 11, in the case of a gesture of spreading out only an index finger, that is, a gesture of representing a shortcut key indicating "1", a call signal is transmitted to a terminal of a specific person by using a phone number of the specific person set to the shortcut key indicating "1" by such a shortcut key gesture, thereby talking to the specific person on the phone.

In addition, in a case where various gestures are set corresponding to various functions, the various functions can be performed by these various gestures after the mode is changed to the idle state mode.

In the embodiment, since the various functions are performed by the various gestures, it is possible to solve the existing inconvenience occurring when the functions are performed by operating a plurality of buttons or to prevent malfunction caused by a narrow gap between the buttons.

The implementation of various functions in the idle state mode will be described below.

A second image may be acquired by the camera 12 under control of the control unit 30 (S211).

The gesture processing unit 20 determines whether a gesture is present in the second image, based on the second image, and when the gesture is present, the gesture processing unit 20 determines whether the corresponding gesture is a driving gesture (S213).

The driving gesture may have various gestures corresponding to various functions provided in the gesture device.

When the gesture present in the second image is the driving gesture, a function corresponding to the driving gesture may be performed (S215).

For example, as described above, in the case of the gesture of spreading out only the index finger, a call signal is transmitted to a phone number corresponding to a shortcut key "1" in response to such a gesture, thereby connecting a call to a user of the corresponding phone number.

Figure 12:
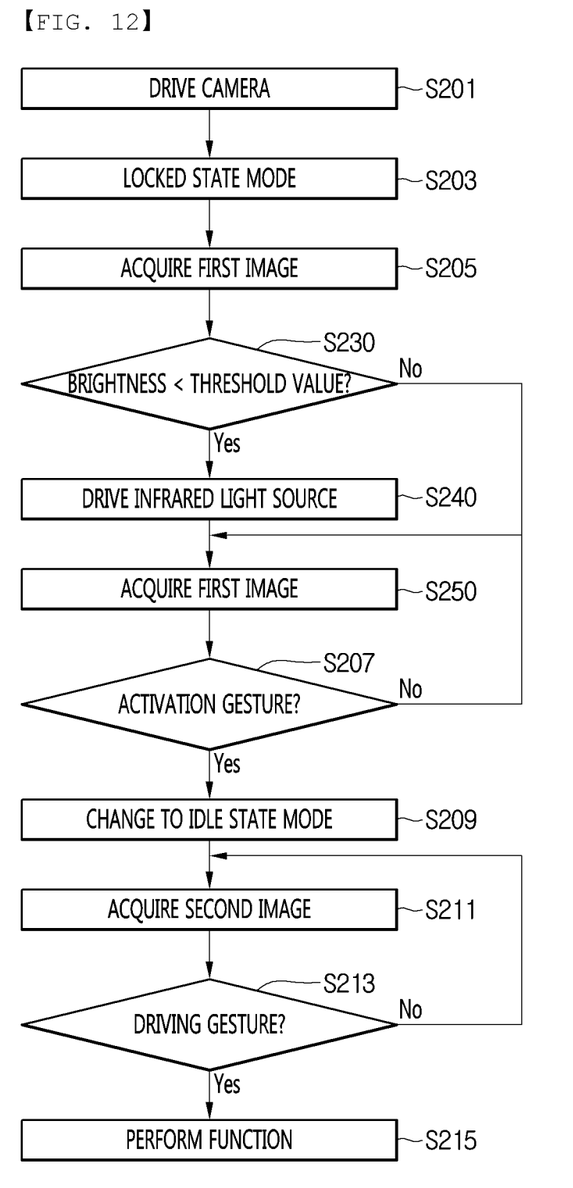
FIG. 12 is a flowchart describing a method for operating a gesture device according to a second embodiment.

FIG. 12 is a flowchart describing a method for operating a gesture device according to a second embodiment.

The second embodiment is substantially similar to the first embodiment, except for operation S230, operation S240, and operation S250. In the second embodiment, the same reference numerals are assigned to the same operations as those of the first embodiment, and detailed descriptions thereof will be omitted. The descriptions omitted in the second embodiment may be easily understood from the first embodiment.

As illustrated in FIG. 12, operation S201 of driving the camera 12, operation S203 of setting a mode to a locked state mode, and operation S205 of acquiring a first image may be performed.

When the first image is acquired, the gesture processing unit 20 checks whether brightness of the first image detected from the first image is less than a threshold value (S230). Herein, the brightness may be brightness of the first image of one frame or may be average brightness of the first image of multiple frames, but is not limited thereto.

A case where the brightness of the first image is less than the threshold value may mean nighttime, and a case where the brightness of the first image is greater than or equal to the threshold value may mean daytime. The threshold value may be previously set, or may be set by the user.

When the brightness of the first image is less than the threshold value, the infrared light source 14 may be driven and infrared light under may be irradiated by the infrared light source 14.

In a state in which the infrared light is irradiated by the infrared light source 14, the first image may be acquired again by the camera 12 (S250). A color of the first image acquired at this time may be different from a color of the first image acquired in operation S205. That is, while the first image acquired in operation S205 has a color, the first image acquired in operation S250 may be black and white.

Since subsequent operations S207, S209, S211, S213, and S215 are the same as those of the first embodiments, further descriptions thereof will be omitted.

When the brightness of the first image is greater than or equal to the threshold value in operation S230, operation S207 may be directly performed, without driving the infrared light source 14.

Figure 13:
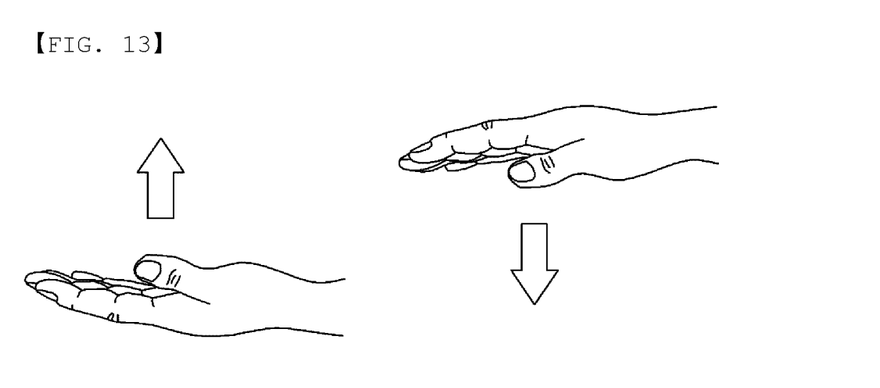
FIG. 13 is a view illustrating further another example of the driving gesture.

FIG. 13 is a view illustrating further another example of the driving gesture.

For example, as illustrated in FIG. 13, in a case where, in a state in which fingers are naturally spread out while opening a hand, a palm faces a floor of a vehicle and moves downward or the palm faces a roof of the vehicle and moves upward, it is possible to turn up or down a volume of a multimedia, which is the output module, by the corresponding gesture.

Figure 14:
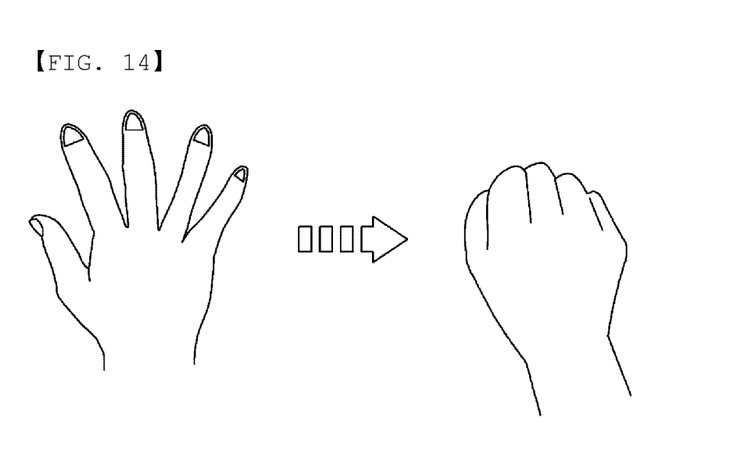
FIG. 14 is a view illustrating still further another example of the driving gesture.

FIG. 14 is a view illustrating still further another example of the driving gesture.

Referring to FIG. 14, a gesture of clenching a fist in a state in which a palm faces a floor of a vehicle and fingers are spread out while a hand is opened can operate and perform a specific function of an output module that plays music or executes a navigation.

Figure 15:
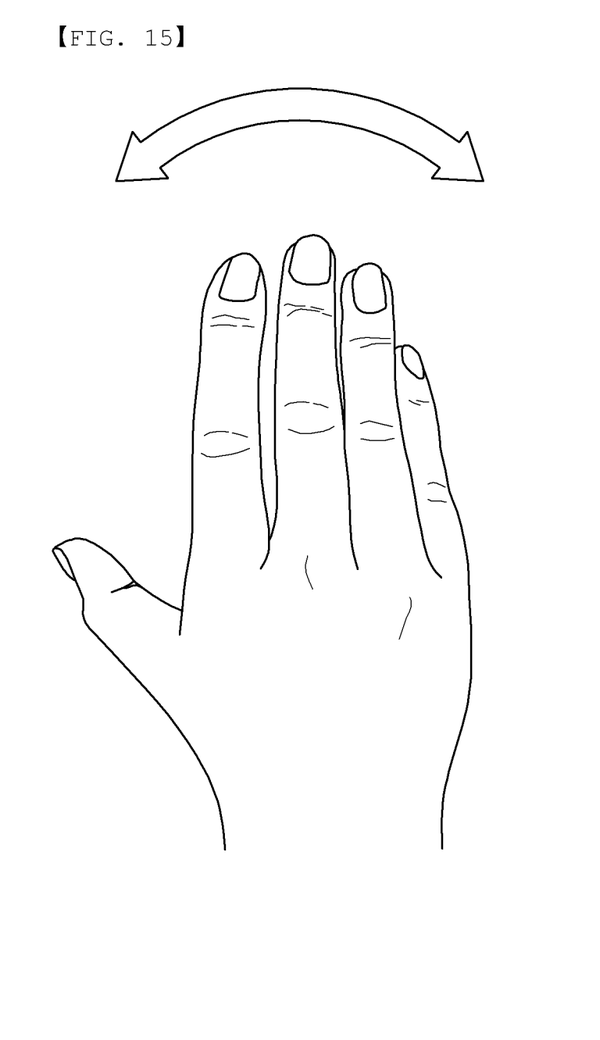
FIG. 15 is a view illustrating even further another example of the driving gesture.

FIG. 15 is a view illustrating even further another example of the driving gesture.

Referring to FIG. 15, in a case where a hand is waved two or three times from side to side in a state in which a palm faces a floor of a vehicle and fingers are naturally spread out while a hand is opened, the corresponding gesture can stop playing music and perform a movement to an upper-level menu or perform a simple movement from a certain menu to an upper-level menu of the corresponding menu.

The invention claimed is:

1. A gesture device comprising:
an infrared light source configured to irradiate infrared light;
a camera configured to capture an image in a locked state mode for receiving an activation gesture and in an idle state mode for receiving a plurality of driving gestures;
a gesture processing unit configured to extract a gesture from the image captured via the camera while in the locked state mode and the idle state mode; and
a control unit configured to:
capture a first image, via the camera, while in the locked state mode, and extract brightness information from the first image, and drive the infrared light source to irradiate the infrared light when the brightness information is less than a threshold value,
capture a second image, via the camera, while in the locked state mode in which the infrared light is irradiated by the infrared light source,
obtain a first gesture extracted from the second image while in the locked state mode,
determine whether the first gesture is the activation gesture while in the locked state mode,
in response to the first gesture being different than the activation gesture while in the locked state mode, ignore the first gesture,
in response to the first gesture being the activation gesture while in the locked state mode, change the locked state mode to the idle state mode,
capture a third image, via the camera, while in the idle state mode after the changing the locked state mode to the idle state mode,
obtain a second gesture extracted from the third image while in the idle state mode,
determine whether the second gesture is a driving gesture,
in response to the second gesture being a first driving gesture among the plurality of driving gestures while in the idle state mode, execute a first function corresponding to the first driving gesture, and
in response to the second gesture, which represents the activation gesture in the locked state mode, representing a second driving gesture among the plurality of driving gestures while in the idle state mode, execute a second function corresponding to the second driving gesture,
wherein the second function is different than a function of changing the locked state mode to the idle state mode, and
wherein the activation gesture and the second driving gesture are a same gesture that corresponds to different functions in the locked state mode and the idle state mode.

2. The gesture of claim 1, wherein the first to third images include an image of a hand or a forearm.

3. A vehicle, which includes a driver seat, a console box disposed adjacent to the driver seat, a gear knob, and a rearview mirror, the vehicle comprising:
an infrared light source configured to irradiate infrared light;
an input module installed in a lower side of the rearview mirror and configured to capture an image in a locked state mode for receiving an activation gesture and in an idle state mode for receiving a plurality of driving gestures;
a gesture processing unit configured to extract a gesture from the image captured via the camera while in the locked state mode and the idle state mode; and
a control unit configured to:
capture a first image, via the input module, while in the locked state mode, and extract brightness information from the first image and drive the infrared source to irradiate the infrared when the brightness information is less than a threshold value,
capture a second image, via the input module, while in the locked state mode in which the infrared light is irradiated by the infrared light source,
obtain a first gesture extracted from the second image while in the locked state mode,
determine whether the first gesture is the activation gesture while in the locked state mode,
in response to the first gesture being different than the activation gesture while in the locked state mode, ignore the first gesture,
in response to the first gesture being the activation gesture while in the locked state mode, change the locked state mode to the idle state mode,
capture a third image, via the camera, while in the idle state mode after the changing the locked state mode to the idle state mode,
obtain a second gesture extracted from the third image while in the idle state mode,
determine whether the second gesture is a driving gesture,
in response to the second gesture being a first driving gesture among the plurality of driving gestures while in the idle state mode, execute a first function corresponding to the first driving gesture, and
in response to the second gesture, which represents the activation gesture in the locked state mode, representing a second driving gesture among the plurality of driving gestures while in the idle state mode, execute a second function corresponding to the second driving gesture,
wherein the second function is different than a function of changing the locked state mode to the idle state mode, and
wherein the activation gesture and the second driving gesture are a same gesture that corresponds to a different functions in the locked state mode and the idle state mode.

4. The vehicle of claim 3, wherein the gesture processing unit extracts the first and second gestures based on shape information of an object extracted from the corresponding image, among the first, second and third images, shape motion information of the object, silhouette information of the object, and color information of the object.

5. A method for operating a gesture device, the method comprising:
    acquiring a first image in a locked state mode;
    extracting brightness information from the first image;
    in response to the brightness of the first image being less than a threshold value, driving an infrared light source to irradiate infrared light;
    acquiring a second image while in the locked state mode in which the infrared light is irradiated by the infrared light source,
    extracting a first gesture from the second image while in the locked state mode;
    checking whether the first gesture is an activation gesture;
    in response to the first gesture being different than the activation gesture while in the locked state mode, ignoring the first gesture;
    in response to the first gesture being the activation gesture, changing a locked state mode to an idle state mode;
    acquiring a third image after the changing the locked state mode to the idle state mode;
    extracting a second gesture from the third image while in the idle state mode;
    checking whether the second gesture is a driving gesture; and
    in response to the second gesture being a first driving gesture among the plurality of driving gestures while in the idle state mode, executing a first function corresponding to the first driving gesture, and
    in response to the second gesture, which represents the activation gesture in the locked state mode, representing a second driving gesture among the plurality of driving gestures while in the idle state mode, executing a second function corresponding to the second driving gesture,
    wherein the activation gesture and the second driving gesture are a same gesture,
    wherein the same gesture corresponds to the different functions in the locked state mode and the idle state mode, and
    wherein the second function is different than a function of changing the locked state mode to the idle state mode.

\* \* \* \* \*